May 15, 1934. T. R. HARRISON Re. 19,165

INSTRUMENT CASE

Original Filed June 6, 1930 2 Sheets-Sheet 1

INVENTOR.
THOMAS R. HARRISON
BY John E. Dubbell
ATTORNEY

May 15, 1934. T. R. HARRISON Re. 19,165

INSTRUMENT CASE

Original Filed June 6, 1930 2 Sheets-Sheet 2

INVENTOR.
THOMAS R. HARRISON

BY John E. Hubbell
ATTORNEY

Reissued May 15, 1934

Re. 19,165

UNITED STATES PATENT OFFICE 19,165

INSTRUMENT CASE

Thomas R. Harrison, Wyncote, Pa., assignor to The Brown Instrument Company, Philadelphia, Pa., a corporation of Pennsylvania Original No. 1,859,872, dated May 24, 1932, Serial No. 459,478, June 6, 1930. Application for reissue December 15, 1933, Serial No. 702,610

13 Claims. (Cl. 248—30)

My present invention relates to the construction and mounting of the enclosing cases for pyrometers, flow meters and other instruments, which are desirably mounted in one or another of different ways depending upon the conditions of use. The general object of the present invention is to provide an instrument case which is simple in construction, and is adapted for flush panel mounting, for mounting on a wall and for mounting on a table. The invention is characterized by the simple and effective provisions made for mounting an instrument casing in either of the three ways above mentioned, without requiring the instrument case to be so shaped as to be unsightly with any of said mountings, or difficult to box for shipment.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings:—

Figure 1:
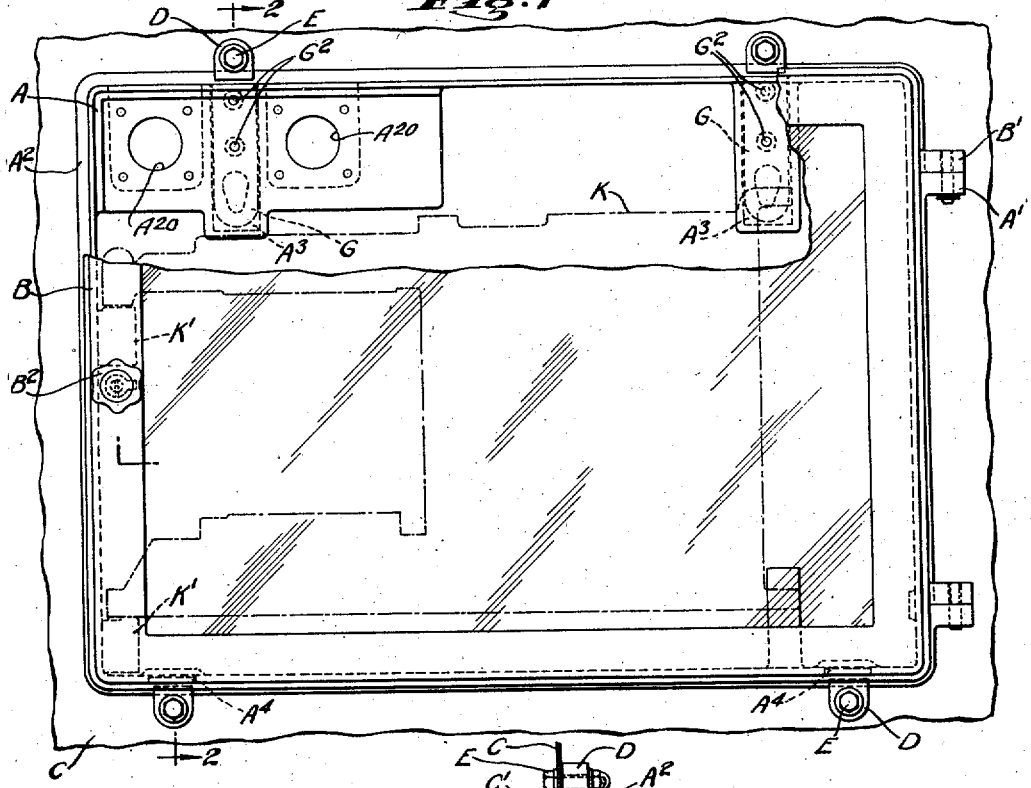
Fig. 1 is a front elevation of an instrument casing with a flush panel mounting.

The instrument casing shown in the drawings comprises a box-like structure or casing body A of rectangular outline, which may well be a dye-casting of aluminum, though it may be made of other material. The casing body A is open at its front, to permit access to its interior when the casing door B is open. The door B is hinge-connected to the body A at one side of the latter. As shown, the casing body A is formed with integral hinge lugs A′ connected by hinge pintles to hinge lugs B′ formed on the corresponding side of the door B. $B^2$ is a knob for opening and closing the door and locking it in its closed position.

The instrument body is provided with a relatively narrow outwardly projecting flange $A^2$ at the margin of the door opening. With the flush panel mounting shown in Figs. 1 and 2, the casing body extends through an opening C′ in a vertically disposed panel plate or slab C, and the rear side of the flange $A^2$ bears against the panel plate C at the margin of the opening C′ therein. In the preferred construction illustrated, the instrument case is clamped against the panel C by means of clips or clamp-parts D, located above and below the opening C′ and secured to the panel C by corresponding bolts E passing through the panel and clamp parts.

Figure 3:
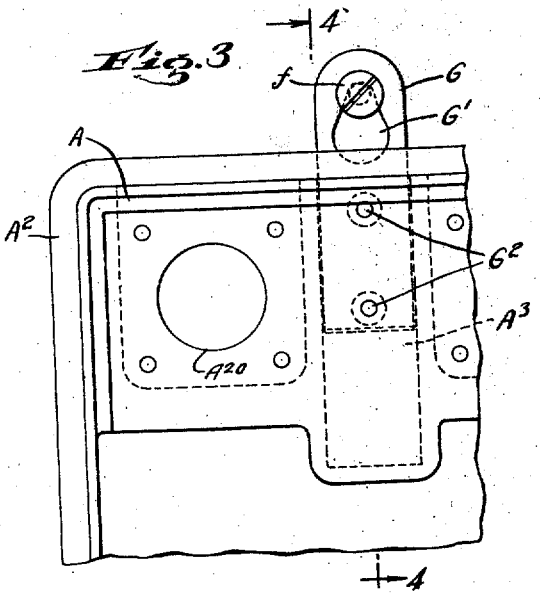
Fig. 3 is a front elevation of a portion of the instrument casing shown in Figs. 1 and 2 with the casing mounted on a wall.
Figure 4:
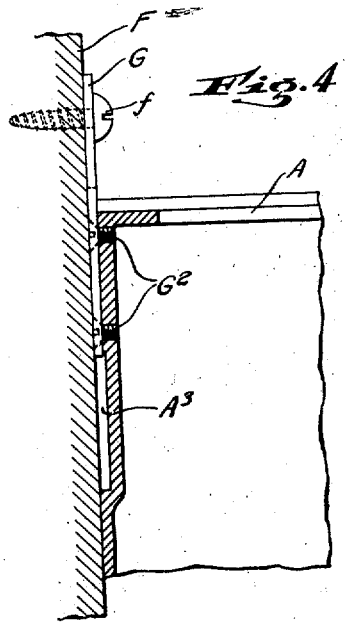
Fig. 4 is a partial section on the line 4—4 of Fig. 3.

When the instrument case is mounted on a vertical wall F as shown in Figs. 3 and 4, it is anchored to the wall by means of hanger parts G secured to the casing body at the back of the latter, and hook-like parts *f* attached to the wall and advantageously in the form of screws or stud bolts threaded into the wall and passing through apertures G′ in the hanger parts G. Advantageously, and as shown, the hanger parts G are plate or bar-like pieces of metal, and the lower portions of which, in the condition of the apparatus shown in Figs. 3 and 4, are received in grooves or open pockets $A^3$ formed in the outer face of the back wall of the casing body and extending downward from the top of the latter. Each hanger part is secured in the corresponding pocket $A^3$ by two screws $G^2$ tapped into the portion of the rear wall of the casing body forming the bottom of said pocket $A^3$.

Figure 2:
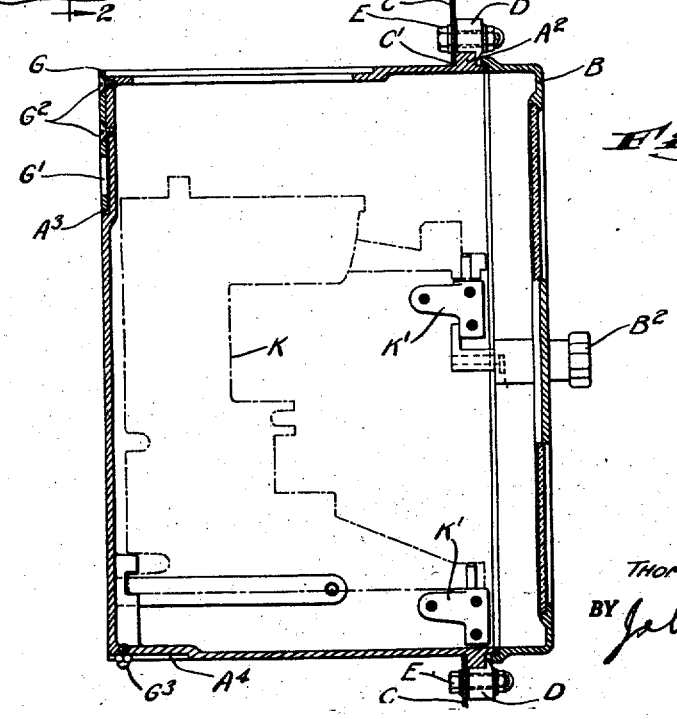
Fig. 2 is a section on the line 2—2 of Fig. 1.

Advantageously, and as shown in the drawings, the pockets $A^3$, the parts G and the spacing of the holes for the screws $G^2$ are so relatively proportioned, that each part G may be secured in place in its pockets $A^3$ with either end uppermost, and when secured in place with the end containing the aperture G at the bottom as shown in Figs. 1 and 2, the then upper end of the part G is flush with the top of the casing body. In the condition of the apparatus illustrated in Figs. 1 and 2, the parts G do not interfere with the insertion of the instrument case in, or its removal from the opening C′ in the opening C, and do not interfere with the packaging of the instrument for shipment.

In changing from the flush panel mounting to the wall mounting the parts G are disconnected from the casing body turned end for end and then again secured to the casing body by the screws $G^2$. Advantageously, and as shown, the openings G′ in the parts G, are of key-hole form, the bottom part of each opening, when the parts are in the position shown in Figs. 3 and 4, being large enough for the passage of the heads of the bolts *f*, whereas the then upper portions of the openings G′ are narrowed to fit about the bodies of the bolts *f*, the heads of which then extend beyond the margins of the upper portions of the openings G′.

Figure 5:
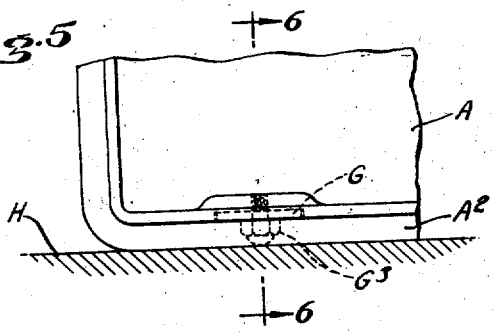
Fig. 5 is a front elevation of the instrument casing shown in Figs. 1 and 4, mounted on a table.
Figure 6:
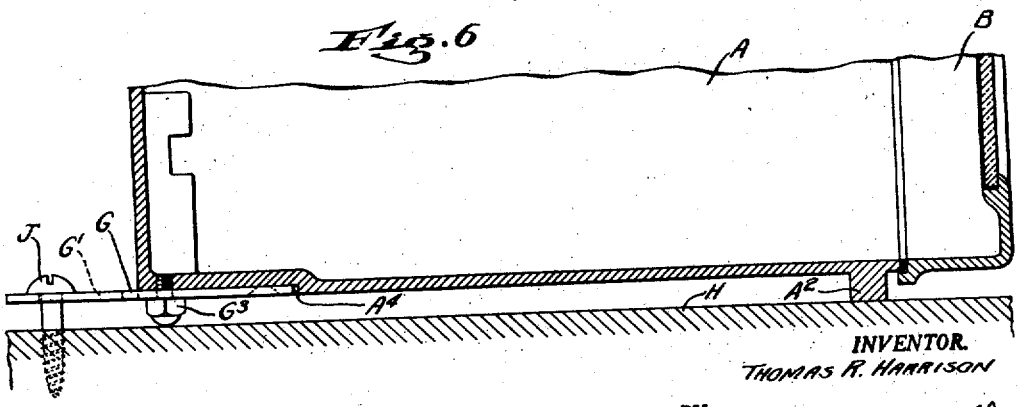
Fig. 6 is a partial section on the line 6—6 of Fig. 5.

In the table mounting illustrated in Figs. 5 and 6, the lower edge of the casing body flange $A^2$ bears against the top of the table H on which the instrument is mounted, as do the instrument case feet formed by rubber headed screws $G^3$ which are tapped into the underside of the instrument case A, adjacent the rear end of the latter. The screws $G^3$ then pass through the parts G which have been removed from the pockets $A^3$ and are partly received in open pockets or grooves $A^4$ formed in the underside of the casing body A. The pockets $A^4$ are open at the rear side of the instrument and the parts G project therefrom to the rear of the body A, and are secured to the table H by screws or tap bolts J threaded into the table H. When the parts G are received in the pocket $A^3$ as shown in Figs. 1–4, the screws $G^3$ may be screwed into the casing body far enough so that the head portions of the screws, are wholly or mainly received in the pockets $A^4$, and do not interfere with the movement of the casing body into and out of the opening C′ in the panel C, and do not project from the instrument casing far enough to be objectionably noticeable when the apparatus is mounted on a wall as shown in Figs. 3 and 4.

In the particular instrument casing construction illustrated in the drawings, an instrument supporting frame or arm K is pivotally connected to hinge lugs K′ within the casing body A and shown as secured to the side wall of the latter opposite to that to which the casing door is hinged by means of screws. All of the arm K, except the portion immediately adjacent the hinge lugs K′, may be swung out of the instrument casing when the door B is in its open position, to permit of inspection, adjustment and repairs of an instrument (not shown) mounted on said arm. While the invention is obviously not limited to an instrument casing comprising a pivoted arm like the arm K, the possible use of such an instrument mounting is a factor to be taken into account in this connection, since such use requires, and emphasizes the importance of a strong and rigid attachment of the instrument casing to the structure by which it is supported. Some instruments, for example, potentiometer instruments, are quite heavy, and the weight of such instrument, when swung out of the instrument casing on the arm K, exerts a very considerable leverage on the instrument casing tending to wrench the latter out of its proper position.

As shown, the instrument case A, is formed with apertures $A^{20}$ for the passage of conducting leads connected to the instrumentalities normally housed in the casing, but their use is not a characteristic of the present invention.

As will be understood by those skilled in the art, the form of instrument mounting employed in any particular installation ordinarily depends upon conditions at that installation. Considerable numbers of instruments of the same pattern are mounted in each of the three ways mentioned above. Heretofore manufacturers of such instruments have commonly employed different instrument casing forms for use in mounting the same instrument in different ways. The provision of a casing adapted for interchangeable use with the different mounting obviously results in lower manufacturing costs. The casing construction illustrated not only facilitates the use of whichever form of mounting may be most desirable in any particular installation, but secures this result without the use of projecting parts which make the instrument unsightly when mounted on a wall or table, and increase the difficulty of packing the instrument for shipment. A minor, but practically important advantage of the invention, is that the parts G and the screws $G^2$ and $G^3$ tapped into the instrument casing for securing the parts G in their different positions may all be attached to the instrument casing when the latter is packed for shipment so that the instrument may be shipped with all parts attached to it which are required for use in mounting the instrument in any of the above described ways.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. An instrument casing comprising a box-like body closed at its rear side and open at its front side and formed at said front side with a marginal flange projecting a small distance outwardly from said body and adapted for engagement with a panel at the margin of an opening therein through which said body may extend, and having provisions at its rear side adapted to cooperate with a supporting structure having a vertically disposed face and securing means extending forwardly from said face to attach said body to said structure and to hold said body in an upright position.

2. An instrument casing comprising a box-like body closed at its rear side and open at its front side and formed at said front side with a marginal flange projecting a small distance outwardly from said body and adapted for engagement with a panel at the margin of an opening therein through which said body may extend, and having provisions at its rear side adapted for the attachment to said body of means securing the latter to a supporting structure from which said body may project, said provisions comprising a part secured to and extending laterally away from said body.

3. An instrument casing comprising a box-like body closed at its rear side and open at its front side and formed at said front side with a marginal flange projecting a small distance outwardly from said body and adapted for engagement with a panel at the margin of an opening therein through which said body may extend, and having an external recess adapted to receive securing means which project forwardly from a supporting structure in front of which said body may project and to which it is thereby attached.

4. An instrument casing comprising a box-like body closed at its rear side and open at its front side and formed at said front side with a marginal flange projecting a small distance outwardly from said body and adapted for engagement with a panel at the margin of an opening therein through which said body may extend, and having external provisions at its rear side adapted for the attachment of said body to a supporting structure in front of which said body may project by attachment operations performed in front of said structure.

5. An instrument casing comprising a box-like body open at its front side and formed at said side with a marginal flange projecting a small distance outwardly from said body and adapted for engagement with a panel at the margin of an opening therein through which said body may extend and having provisions at its rear side for detachably securing to said body means for the attachment of said body to a wall in front of which said body may extend and having provisions for securing to its underside means for the attachment of said body to a table upon which said body may rest.

6. An instrument casing comprising a box-like body open at its front side and formed at said side with a marginal flange projecting a small distance outwardly from said body and adapted for engagement with a panel at the margin of an opening therein through which said body may extend and formed at its underside with screw openings remote from said flange and recesses surrounding said openings, and headed screws threaded into said openings and adapted to have their heads received in said recesses or to project out of said recesses to form supporting feet for engagement with the top of a table upon which said body may be supported through said feet and the portion of said flange at the underside of said body.

7. An instrument casing comprising a box-like body open at its front side and formed at said side with an outwardly projecting marginal flange and formed with pockets and bolt openings at its rear side to receive attaching parts and means for securing said parts to the casing, either with portions of said parts projecting away from the body of the casing for attachment to a supporting structure from which the casing projects, or with substantially all portions of said parts received in said pockets.

8. An instrument casing comprising a box-like body open at its front side and formed at said side with a marginal flange projecting a small distance outwardly from said body and adapted for engagement with a panel at the margin of an opening therein through which said body may extend and having open pockets formed in its rear side, parts adapted to be received in said pockets and provisions for detachably securing said parts in said pockets either with said parts substantially entirely received in said pockets or with portions of said parts projecting upward from said body for the attachment of the latter to a wall in front of which said body may extend, and means for attaching said parts to the underside of said casing body with portions of said parts projecting to the rear of the rear side of said body for the attachment of the latter to a table above which said body may extend.

9. An instrument casing comprising a box-like body open at its front side and formed at said side with a marginal flange projecting a small distance outwardly from said body and adapted for engagement with a panel at the margin of an opening therein through which said body may extend and having open pockets formed in its rear side, parts adapted to be received in said pockets and provisions for detachably securing said parts in said pockets either with said parts substantially entirely received in said pockets or with said parts projecting upward from said body for the attachment of said casing body to a wall in front of which said body may extend, and means including headed screws for attaching said parts to the underside of said casing body whereby said body may be secured to a table about which said body extends with said parts and screws spacing the rear side of said body away from said table by a distance corresponding to the depth of the portion of said flange at the underside of said body.

10. An instrument casing comprising a box-like body open at its front side, a marginal flange projecting a small distance outwardly from said body adjacent the front side thereof and having a horizontally arranged lower surface, screw openings formed in the underside of said body remote from said flange, and headed screws threaded into said openings, said screws adapted to be arranged to form feet cooperating with said flange lower surface in supporting said body on a level supporting structure.

11. An instrument casing comprising a box-like body open at its front side, a marginal flange projecting a small distance outwardly from said body adjacent the front side thereof and having a horizontally arranged lower surface, screw openings formed in the underside of said body remote from said flange, and headed screws threaded into said openings, the portions of said body immediately surrounding said openings being formed with recesses, said screws adapted to be arranged to form feet cooperating with said flange lower surface in supporting said body on a level supporting structure and attaching plates arranged in said recesses and secured in position by said screws and adapted to be secured to said supporting structure.

12. An instrument casing comprising in combination a box-like body open at its front side and means for mounting said body on a supporting structure from which said body projects comprising a recess formed in the rear side of said body and terminating at the upper edge thereof, a supporting part positioned in said recess and arranged to project therefrom when in use, said recess being proportioned to receive said supporting part and hold the same entirely within the peripheral outline of said body when said part is not in use, and means for securing said part to said body in its extended and withdrawn positions.

13. An instrument casing comprising a box-like body open at its front side and formed at said side with a marginal flange projecting a small distance outwardly from the periphery of said body and adapted for connection to the marginal portions of a panel opening through which said body may extend, auxiliary body supporting means at the rear of said marginal flange adapted for use in conjunction with or in lieu of said marginal flange, and a recess formed in said body at the rear of said marginal flange and proportioned to receive and hold said auxiliary means substantially within the peripheral outline of said body.

THOMAS R. HARRISON.